United States Patent
He et al.

(10) Patent No.: US 8,868,114 B2
(45) Date of Patent: *Oct. 21, 2014

(54) NETWORK ENTITY FOR MOBILE COMMUNICATIONS

(75) Inventors: Jennifer He, Shanghai (CN); Haibin Chu, Shanghai (CN); Richard Wang, Shanghai (CN); Marshall Xu, Shanghai (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/512,931

(22) PCT Filed: Dec. 11, 2009

(86) PCT No.: PCT/CN2009/001421
§ 371 (c)(1),
(2), (4) Date: Jul. 12, 2012

(87) PCT Pub. No.: WO2011/069279
PCT Pub. Date: Jun. 16, 2011

(65) Prior Publication Data
US 2013/0217423 A1 Aug. 22, 2013

(51) Int. Cl.
*H04W 68/00* (2009.01)
*H04W 68/02* (2009.01)
*H04W 24/04* (2009.01)
*H04W 28/08* (2009.01)

(52) U.S. Cl.
CPC ............ *H04W 68/02* (2013.01); *H04W 68/00* (2013.01); *H04W 28/08* (2013.01); *H04W 24/04* (2013.01)
USPC ........... 455/458; 455/433; 455/560; 370/338; 370/352

(58) Field of Classification Search
USPC ........ 455/458, 432.1–444; 370/338, 352–356
See application file for complete search history.

(56) References Cited

U.S. PATENT DOCUMENTS 6,097,951 A * 8/2000 Ernam et al. ................... 455/433
6,771,983 B1 * 8/2004 Turina et al. ................... 455/560

(Continued)

FOREIGN PATENT DOCUMENTS

CN 101127999 A 2/2008
CN 101242569 A 8/2008

(Continued)

OTHER PUBLICATIONS

3rd Generation Partnership Project, 3rd Generation Partnership Project; Technical Specification Group Services and System Aspects; Intra-domain connection of Radio Access Network (RAN) nodes to multiple Core Network (CN) nodes (Release 8), Technical Specification, 3GPP TS 23.236 V8.0.0, Dec. 1, 2008, pp. 1-38, 3GPP, France.

(Continued)

*Primary Examiner* — Sharad Rampuria
(74) *Attorney, Agent, or Firm* — Coats & Bennett, PLLC

(57) ABSTRACT

The present invention relates to a network entity for handling communications towards a mobile station over a communication network, the mobile station being capable of receiving a paging request from a mobile switching center of a pool of mobile switching centers, and, in response to the paging request, of transmitting a paging response over the communication network. The network entity comprises a receiver (101) for receiving the paging response, the paging response comprising identity information identifying the mobile station, and a transmitter (105) for retransmitting the identity information towards the pool of mobile switching centers.

17 Claims, 6 Drawing Sheets

(56) References Cited

U.S. PATENT DOCUMENTS

| | | | |
|---|---|---|---|
| 7,164,926 B2* | 1/2007 | Papadimitriou et al. | 455/458 |
| 7,668,558 B2* | 2/2010 | Gallagher et al. | 455/458 |
| 7,995,564 B1 | 8/2011 | Baudreaux et al. | |
| 8,160,582 B2* | 4/2012 | Han et al. | 455/433 |
| 8,264,999 B2* | 9/2012 | Ye et al. | 370/312 |
| 8,675,640 B2* | 3/2014 | Liu et al. | 370/352 |
| 2003/0223383 A1 | 12/2003 | Chang et al. | |
| 2004/0203736 A1* | 10/2004 | Serna | 455/426.1 |
| 2006/0089146 A1* | 4/2006 | Gazzard | 455/445 |
| 2009/0061877 A1 | 3/2009 | Gallagher et al. | |
| 2010/0035609 A1* | 2/2010 | Hui et al. | 455/433 |
| 2010/0097974 A1* | 4/2010 | Ye et al. | 370/312 |
| 2013/0210466 A1* | 8/2013 | Arvidsson et al. | 455/458 |
| 2013/0316704 A1* | 11/2013 | Home | 455/433 |

FOREIGN PATENT DOCUMENTS

| | | |
|---|---|---|
| CN | 101394587 A | 3/2009 |
| CN | 101400038 A | 4/2009 |
| EP | 1928192 A1 | 6/2008 |
| EP | 1991015 A1 | 11/2008 |
| WO | 0024216 A2 | 4/2000 |
| WO | WO 2008154882 A1 * | 12/2008 |

OTHER PUBLICATIONS

3rd Generation Partnership Project, "3rd Generation Partnership Project; Technical Specification Group Core Network and Terminals; Mobile radio interface Layer 3 specification; Core network protocols; Stage 3 (Release 9)", Technical Specification, 3GPP TS 24.008 V9.0.0, Sep. 1, 2009, pp. 1-591, 3GPP, France.

3rd Generation Partnership Project, "3rd Generation Partnership Project; Technical Specification Group Radio Access Network; UTRAN Iu interface Radio Access Network Application Part (RANAP) signalling (Release 9)", Technical Specification, 3GPP TS 25.413 V9.0.0, Sep. 1, 2009, pp. 1-400, 3GPP, France.

3rd Generation Partnership Project, "3rd Generation Partnership Project; Technical Specification Group GSM/EDGE Radio Access Network; Mobile radio interface layer 3 specification; Radio Resource Control (RRC) protocol (Release 9)", Technical Specification, 3GPP TS 44.018 V9.2.0, Sep. 1, 2009, pp. 1-425, 3GPP, France.

3rd Generation Partnership Project, "3rd Generation Partnership Project; Technical Specification Group Services and System Aspects; Network Sharing; Architecture and functional description (Release 9)", Technical Specification, 3GPP TS 23.251 V9.0.0, Sep. 1, 2009, pp. 1-19, 3GPP, France.

3rd Generation Partnership Project, "3rd Generation Partnership Project; Technical Specification Group Radio Access Network; Radio Resource Control (RRC); Protocol Specification (Release 9)", Technical Specification, 3GPP TS 25.331 V9.0.0, Sep. 1, 2009, pp. 1-1710, 3GPP, France.

3rd Generation Partnership Project, "3rd Generation Partnership Project; Technical Specification Group Services and System Aspects; Intra-domain connection of Radio Access Network (RAN) nodes to multiple Core Network (CN) nodes (Release 8)", 3GPP TS 23.236 V8.1.0, Dec. 1, 2009, pp. 1-39, 3GPP, France.

* cited by examiner

NETWORK ENTITY FOR MOBILE COMMUNICATIONS

TECHNICAL FIELD

The present invention relates to the field of mobile communications.

BACKGROUND

The increasing demand for wireless telecommunication services has resulted in the growth of many wireless telecommunication systems and increase in the number of roaming wireless subscribers. With the third generation (3G) systems, efforts have been implemented to accommodate and distribute the increased traffic load in the network among a number of mobile switching centers being arranged to form a mobile switching center pool (MSC pool) for handling communications such as mobile terminated calls (MTC) towards a mobile station or mobile originated calls (MOC) from the mobile station. Usually, the MSCs form an interface towards a core network (CN), wherein the communications towards the mobile station are handled via a radio access network which may comprise a node B or a radio network controller (RNC) or a base station controller (BSC).

By way of example, in order to set up a MTC, a MSC in which the mobile station is registered is determined by a Home Location Register (HLR). The MSC initiates a paging request towards the mobile station, which, in response thereto, sends a paging response towards the MSC to proceed further with the MTC. However, if the MSC in which the mobile station is registered is out of service then the RNC may route the returned paging response to any MSC in MSC pool. However, the attempt to establish the MTC may fail if the paging response is transmitted to a MSC which has not been involved in establishing the MTC.

Accordingly, there exists a need for efficiently managing mobile terminated calls in particular if one of the MSCs in the MSC pool is out of service.

SUMMARY

The present invention is based on the finding that mobile terminated calls may efficiently be managed if a network entity, e.g. a MSC or a RNC, determines which MSC initiated a paging request, so that the paging response may directly be forwarded to the relevant MSC.

By way of example, the mobile terminated calls may efficiently be managed by a MSC pool if a MSC which received the paging response without having initiated the paging request determines which MSC in pool paged the mobile station by e.g. multicasting an identity information identifying the mobile station towards the MSCs in pool. Correspondingly, the mobile terminated calls may also efficiently be managed by a RNC which, upon receiving the paging response from the mobile station, determines which MSC transmitted the paging request by e.g. multicasting the identity information towards the MSC pool. Further, the paging response may be forwarded to that MSC which paged the mobile station.

According to an aspect, the invention relates to a network entity for handling communications such as mobile terminated calls towards a mobile station over a communication network. The mobile station may be capable of receiving a paging request from a mobile switching center of a pool of mobile switching centers and, in response thereto, of transmitting a paging response over the communication network, wherein the paging response may comprise identity information identifying the mobile station. Preferably, the network entity comprises a receiver for receiving the paging response, the paging response comprising identity information identifying the mobile station, and a transmitter for re-transmitting the identity information towards the pool of mobile switching centers.

The terms "receiver" and "transmitter" may refer to receiving and transmitting entities comprising RF modules and antennas for wireless communications. However, the terms "receiver" and "transmitter" may also refer to receiving or transmitting entities enabling communications of corresponding protocol layers at the transmitting and/or at the receiving side.

According to an embodiment, the transmitter may be configured to re-transmit the identity information towards the pool of mobile switching centers in order to determine which mobile switching center in the pool of mobile switching centers initiated the paging request. By way of example, the re-transmitted identity information may, in turn, initiate a transmission of an acknowledgement message indicating the relevant MSC which initiated the paging request.

According to an embodiment, the network entity may form a mobile switching center or a radio network controller or a base station controller.

According to an embodiment, the network entity comprises a processor for determining upon the basis of the identity information which mobile switching center initiated the paging request.

According to an embodiment, the network entity may be a mobile switching center comprising a processor for determining whether the paging request was initiated by the network entity. By way of example, the transmitter may multicast the identity information e.g. within the MSC pool if the paging request initiating, i.e. triggering, the paging response was not initiated by the network entity.

According to an embodiment, the network entity may form a mobile switching center, wherein the transmitter is configured to re-transmit the identity information if the paging request was not initiated by the network entity.

According to an embodiment, the network may be a mobile switching center comprising a processor being configured to compare the identity information with pre-stored identity information, in particular with pre-stored International Mobile Subscriber Identity in a Visitor Locator Register or with pre-stored Temporary Mobile Subscriber Identity, for determining whether the network entity initiated the paging request.

According to an embodiment, the transmitter may be configured to multicast the identity information within or towards the pool of mobile switching centers. In this regard, the term "multicasting" denotes transmitting the identity information towards a certain group of recipients. Furthermore, the transmitter may be configured to broadcast the identity information over or towards the communication network. In this regard, the term "broadcasting" denotes transmitting the identity information towards unknown recipients. Furthermore, transmitter may be configured to re-transmit the identity information e.g. directly to a further mobile switching center.

According to an embodiment, the network entity may comprise a memory for temporarily storing the paging response. By way of example, the paging response may be deleted upon expiration of a predetermined period of time or upon reception of an acknowledgement message from a mobile switching center in response to the re-transmitted identity information, wherein the acknowledgement message indicates that the paging request was initiated by the mobile switching center.

According to an implementation, the network entity may further comprise a counter for determining an expiration of a predetermined period of time after re-transmitting the identity information in order to e.g. remove the identity information from the aforementioned memory. The counter may be formed by a timer controlled by the processor or by the transmitter and started when re-transmitting the identity information.

According to an embodiment, the receiver may be configured to receive an acknowledgement message from a mobile switching center in response to the re-transmitted identity information, wherein the acknowledgement message may indicate that the paging request was initiated by the mobile switching center. In response thereto, the transmitter may be configured to forward the paging response to the mobile switching center for further proceeding with the mobile terminated call.

According to an embodiment, the identity information may comprise an International Mobile Subscriber Identity (IMSI) or a Temporary Mobile Subscriber Identity (TMSI). Thus, the receiver may re-transmit the received IMSI or TMSI in order to determine which mobile switching center in the pool of mobile switching centers initiated the paging request. The processor may correspond to the processor mentioned above.

According to an embodiment, the network entity may be a mobile switching center comprising a processor which may be configured to determine upon the basis of the identity information whether the paging request initiating the paging response was transmitted by the network entity, i.e. was initiated by the network entity. For example, the processor may refer to a Visitor Locator Register (VLR) of the network entity in order to determine whether the VLR comprises a corresponding entry indicating that the network entity initiated the paging request towards the mobile station. The processor may correspond to the processor mentioned above.

According to an embodiment, the network entity may be a mobile switching center being capable of receiving further identity information from a further mobile switching center, wherein the identity information may be received by the receiver. Correspondingly, the network entity may comprise a processor which may be configured to compare the further identity information with pre-stored identity information, e.g. in a VLR, in order to determine whether the network entity initiated the further paging request in response to which the paging response was transmitted. The processor may correspond to the processor mentioned above. Furthermore, the transmitter may be configured to transmit an acknowledgement message to the further mobile switching center if the further identity information corresponds to the pre-stored identity information, wherein the acknowledgement message indicates that the network initiated the further paging request. However, the processor or the transmitter may also be configured to discard the further identity information without notice or response when the network entity did not initiate the further paging request. Thus, unnecessary communications between mobile switching centers in the pool of mobile switching centers may be avoided.

According to an embodiment, the network entity may be arranged to support communications according to the Universal Mobile Telecommunication System (UMTS), and/or to the Global System for Mobile Communications (GSM), and/or to the Long Term Evolution (LTE) technology, and/or to the Code Division Multiple Access 2000 (CDMA2000) technology.

According to a further aspect, the invention relates to a pool of network entities forming a pool of mobile switching centers for handling communications towards a mobile station according to the principles described herein.

According to some aspects and embodiments addressed in the following, the invention in particular relates to a mobile switching center being arrangeable in a pool of mobile switching centers.

Preferably, the mobile switching center comprises a receiver for receiving the paging response comprising the identity information, a processor for determining whether the paging request was initiated by the mobile switching center.

The mobile switching center may further comprise a transmitter for re-transmitting the identity information e.g. towards a MSC pool if the paging request was not initiated by the mobile switching center. The identity information is transmitted in order to determine which mobile switching center in the MSC pool transmitted the paging request towards the mobile station.

The transmitter may re-transmit the paging response comprising the identity information to a further mobile switching center in a pool of mobile switching centers for further proceeding with e.g. a MTC.

The transmitter may be configured to multicast the identity information towards the pool of mobile switching centers. Furthermore, the transmitter may be configured to broadcast the identity information over or towards the communication network and/or to re-transmit the identity information e.g. directly to a further mobile switching center.

The mobile switching center may comprise a memory for temporarily storing the paging request. By way of example, the paging request may be deleted upon expiration of a predetermined period of time or upon reception of an acknowledgement message from a further mobile switching center in response to the re-transmitted identity information, wherein the acknowledgement message indicates that the paging request was initiated by the further mobile switching center.

The mobile switching center may further comprise a counter for determining an expiration of a predetermined period of time after re-transmitting the identity information in order to e.g. remove the identity information from the aforementioned memory. The counter may be formed by a timer controlled by the processor or by the transmitter and started when re-transmitting the identity information.

The receiver may be configured to receive an acknowledgement message from a further mobile switching center in response to the re-transmitted identity information, wherein the acknowledgement message may indicate that the paging request was initiated by the further mobile switching center. In response thereto, the transmitter may be configured to forward the paging response to the further mobile switching center for further proceeding with the mobile terminated call.

The processor may be configured to determine upon the basis of the identity information whether the paging request was initiated by the mobile switching center. For example, the processor may refer to a Visitor Locator Register (VLR) of the mobile switching center in order to determine whether the VLR comprises a corresponding entry indicating that the mobile switching center transmitted the paging request to the mobile station.

The processor may be configured to compare the identity information with pre-stored identity information in order to determine whether the paging request triggering the paging response was initiated by the mobile switching center. The pre-stored identity information may be an IMSI or a TMSI, so that the processor may compare received and pre-stored IMSIs or TMSIs.

The mobile switching center may also receive further identity information from a further mobile switching center to determine whether the mobile switching center initiated a further paging request triggering a paging response received by the further mobile switching center. Correspondingly, the processor may be configured to compare the further identity information with pre-stored identity information, e.g. in a VLR, in order to determine whether the mobile switching center initiated the further paging request. Furthermore, the transmitter may be configured to transmit an acknowledgement message to the further mobile switching center if the further identity information corresponds to the pre-stored identity information, wherein the acknowledgement message indicates that the mobile switching center initiated the further paging request. However, the processor may also be configured to discard the further identity information without notice or response when the mobile switching center did not initiate the further paging request. Thus, unnecessary communications between mobile switching centers in a pool of mobile switching centers may be avoided.

The mobile switching center may be configured to handle communications of the mobile station in a pool of mobile switching centers. By way of example, the mobile switching center may be arranged for handling communications within a certain area in which the mobile station is located. Furthermore, the mobile switching center may be capable of being interconnected with further mobile switching centers in order to form the pool of mobile switching centers.

According to a further aspect, the invention relates to a method for handling communications such as mobile terminated calls towards a mobile station over a communication network. The mobile station may be capable of receiving a paging request from a mobile switching center of a pool of mobile switching centers and, in response thereto, of transmitting a paging response over the communication network, wherein the paging response may comprise identity information identifying the mobile station. Preferably, the method comprises receiving the paging response, the paging response comprising identity information identifying the mobile station, and re-transmitting the identity information towards the pool of mobile switching centers.

Further method steps are directly derivable from the functionality of the inventive network entity.

According to a further aspect, the invention relates to a computer program for executing the method for handling communications towards a mobile station when run on a computer.

According to a further aspect, the method relates to a programmably arranged network entity being configured to execute the computer program for executing the method for handling communications towards a mobile station.

BRIEF DESCRIPTION OF THE DRAWINGS

Further embodiments of the invention will be described with reference to the following figures, in which.

DETAILED DESCRIPTION

Before embodiments of the invention are described in detail, it is to be understood that this invention is not limited to the particular component parts of the devices described or steps of the methods described as such devices and methods may vary. It is also to be understood that the terminology used herein is for purposes of describing particular embodiments only, and is not intended to be limiting. It must be noted that, as used in the specification and the appended claims, the singular forms "a," "an" and "the" include singular and/or plural referents unless the context clearly dictates otherwise.

Figure 1:
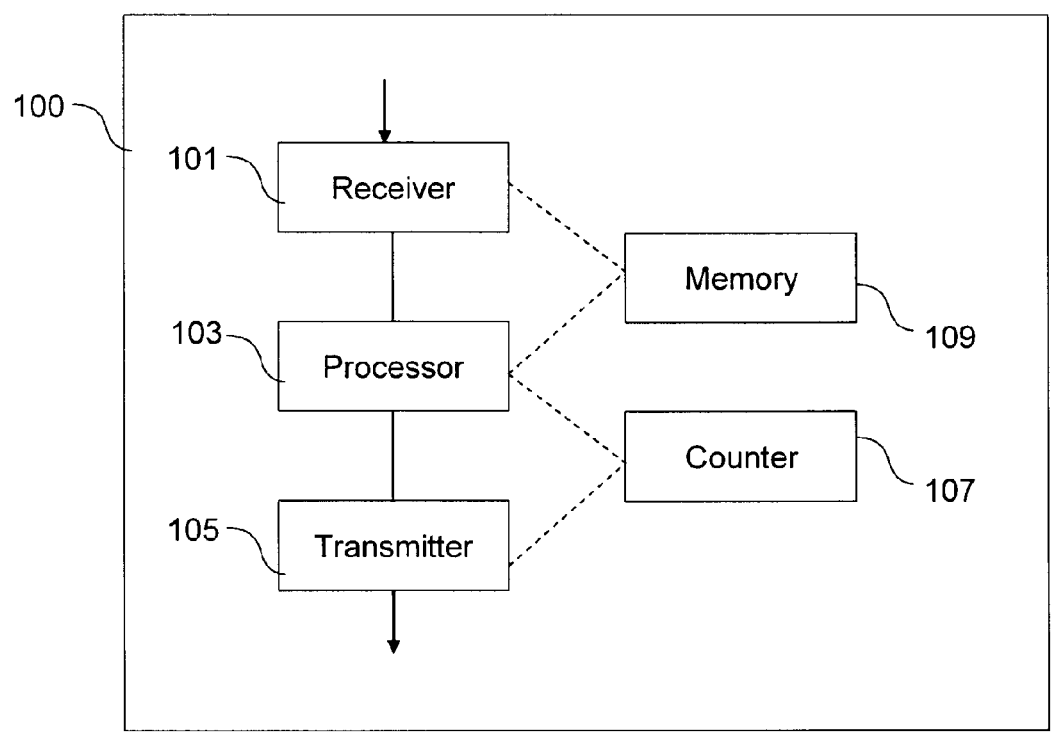
FIG. 1 shows a block diagram of an embodiment of a network entity.

FIG. 1 shows a network entity 100, e.g. a mobile switching center, which may be arranged in a pool of mobile switching centers, or a RNC for handling communications towards a mobile station which is not depicted in FIG. 1.

As depicted in FIG. 1, the network entity may comprise a receiver 101 for receiving a paging response from the mobile station, wherein the paging response may comprise identity information such as IMSI or TMSI identifying the mobile station. The network entity may, optionally, further comprise a processor 103 for determining which mobile switching center in the pool of mobile switching centers transmitted the paging request towards the mobile station. By way of example, if the network entity is a mobile switching center which did not transmit the paging request towards the mobile station, i.e. if a further mobile switching center in the pool of mobile switching centers did transmit the paging request then the network entity center may ask which mobile switching center in pool transmitted the paging request.

For re-transmitting the identity information, the network entity may comprise a transmitter 105 being e.g. arranged to multicast the identity information towards (if the network entity is RNC or BSC) or within (if the network entity is a mobile switching center) the pool of mobile switching centers or to broadcast the identity information e.g. over the communication network or to re-transmit the identity information to a mobile switching center in a peer-to-peer fashion.

In order to at least temporarily save the paging response, the network entity may comprise a memory 109 which may be connected to the receiver 101 and/or to the processor 103. The paging response may be deleted after e.g. an expiration of a predetermined time period after re-transmitting the identity information. The memory may be controlled by the receiver 101 and/or by the processor 103 and/or by the transmitter 105. According to some implementations, the network entity may further comprise a counter 107, e.g. a timer, for determining the expiration of the predetermined time period. The counter 107 may be controlled by the processor 103 or by the transmitter 105.

Figure 2:
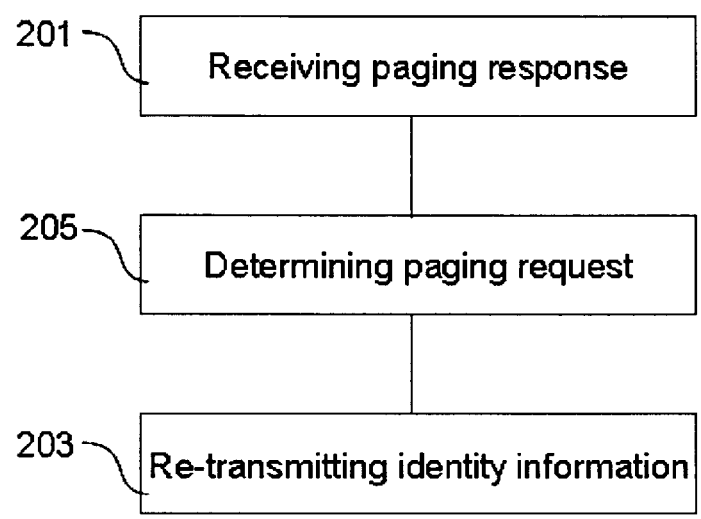
FIG. 2 shows a flow diagram of method steps performed by a network entity for handling communications towards a mobile station.

FIG. 2 shows a diagram of a method for handling communications towards the mobile station comprising receiving 201 the paging response comprising identity information identifying the mobile station, and re-transmitting 203 the identity information in order to determine which mobile switching center in the pool of mobile switching centers initiated the paging request. The method may e.g. be executed by or with reference to a mobile switching center and may further comprise determining 205 whether the paging response was initiated by a paging request transmitted by the mobile switching center to the mobile station, and re-transmitting 203 the identity information if the mobile switching center did not page the mobile station. Further method steps are directly derivable from the functionality of the network entity.

In the following, further embodiments of the network entity being a mobile switching center in a pool of mobile switching centers are described. It is, however, to be understood that these embodiments do not limit the network entity to the mobile switching center. In particular, the enhancements of the mobile switching centers directed to the paging response forwarding approach as described in the following may also be performed by the base station entity such as RNC or BSC.

Figure 3:
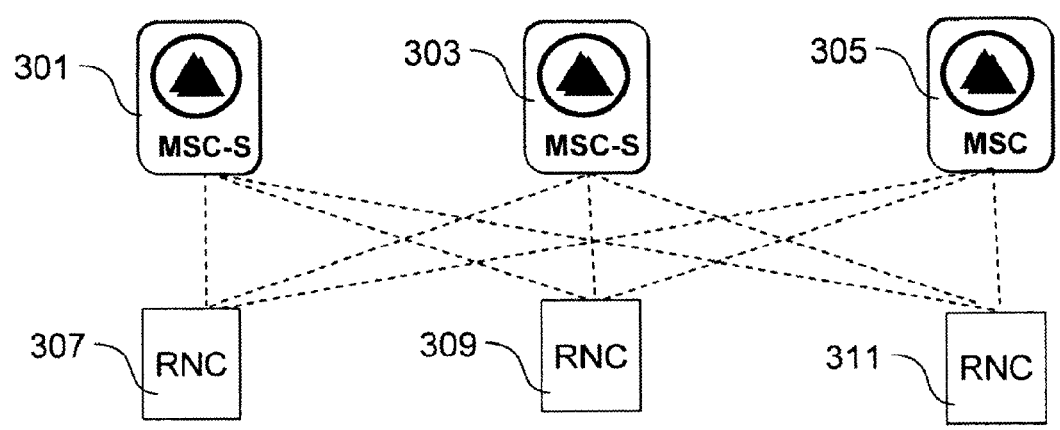
FIG. 3 shows an exemplary arrangement of mobile switching centers in pool.

FIG. 3 shows a pool of interconnected mobile switching centers 301, 303 and 305 being arranged to communicate with mobile stations not depicted in FIG. 3 via base station systems comprising the RNCs 307, 309 and 311. It shall be noted that the RNCs 307, 309, 311 may be replaced by BSCs. The base station systems may wirelessly communicate with the mobile stations located in the cells of the radio access network. As depicted in FIG. 3, the RNCs 307 to 311 are interconnected with the mobile switching centers (MSC) 301 to 305 which may provide a connection mechanism to fixed networks which may include the Public-Switched Telephone Network (PSTN) or an Integrated Service Digital Network (ISDN), by way of example. Furthermore, the MSCs 301 to 305 may comprise or communicate with a Visitor Location Register (VLR) and/or a Home Location Register (HLR) which are not depicted in FIG. 3 in order to provide call routing and roaming capabilities for the respective communication network. By way of example, the HLR may store administrative information of the subscribers along with the current location of the respective mobile station such a Personal Digital Assistant (PDA) or a Personal Communications Service (PCS) device or a cellular phone or a computer.

According to some implementations, a respective RNC node 307 to 311 may be connected to only one MSC 301 to 305. However, the arrangement of the MSCs 301 to 305 in pool allows each RNC 307 to 311, which respectively form a Radio Access Network (RAN) node, to be simultaneously connected to multiple core network (CN) nodes, i.e. to the MSC 301 to 305. Thus, each MSC 301 to 305 may serve communications, i.e. traffic, from and to any RNC 307 to 311.

Figure 4:
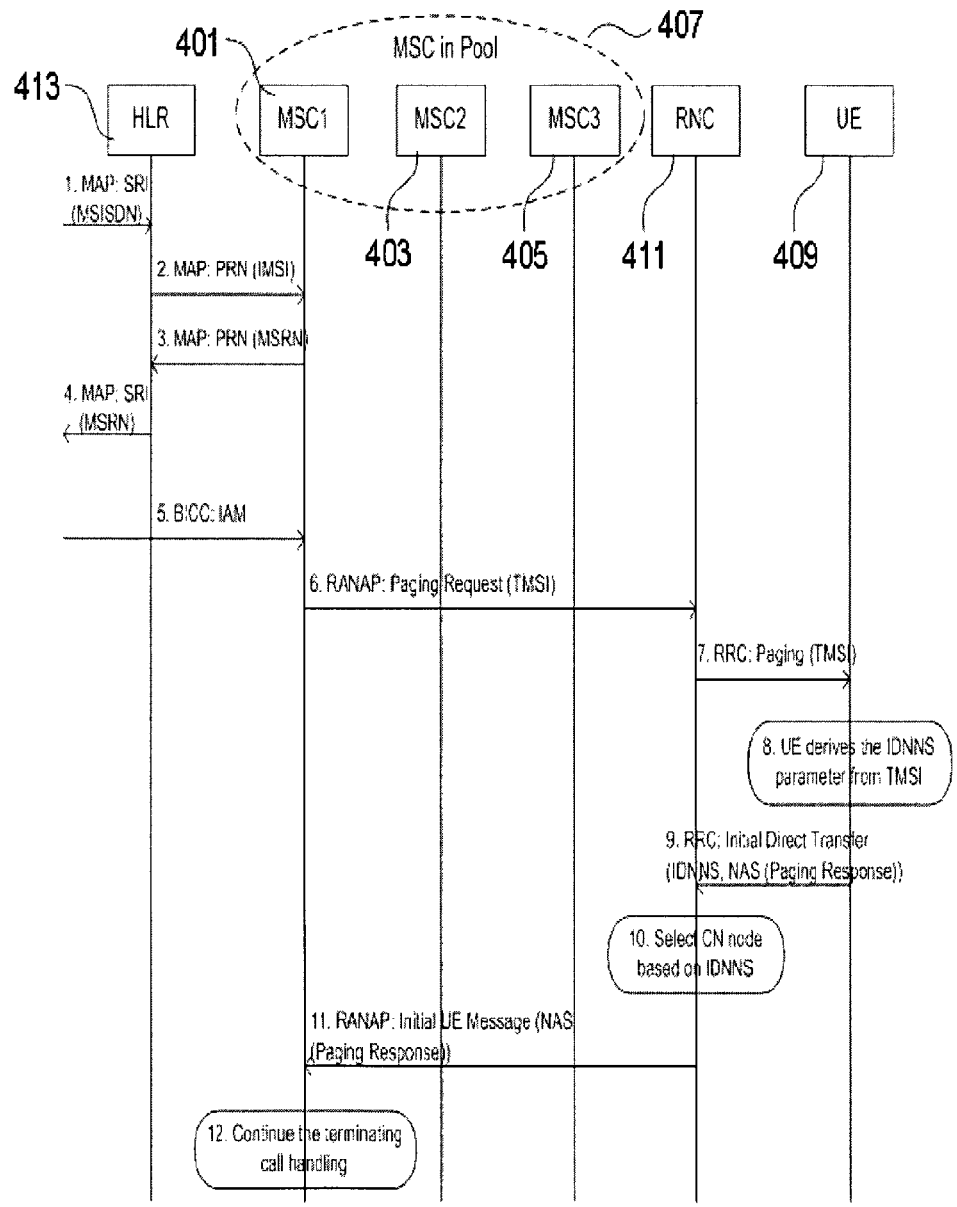
FIG. 4 shows a sequence diagram depicting exemplary messages in a mobile call termination.

FIG. 4 shows a Mobile Terminating (MT) call scenario for MSC in Pool (MiP) in a WCDMA or TD-SCDMA or UMTS MiP network (WCDMA: Wideband Code Division Multiple Access; TD-SCDMA: Time Division-Synchronized Code Division Multiple Access). By way of example, three MSCs 401, 403 and 405 are arranged in a MSC pool 407 for handling communications towards a mobile station 409, e.g. towards user equipment (UE), communicating with a RNC 411. Furthermore, a HLR 413 is provided.

By way of example, the mobile station 409 may be registered in the first MSC 401. When terminating a call to the mobile station 409, the HLR 413 may receive a MAP message comprising Send Routing Information (SRI) from a core network, step 1. In response thereto, the HLR 413 may send a MAP message Provide Roaming Number (PRN) to the first MSC 401, which message may comprise the IMSI of the mobile station 409, step 2. In response thereto, the first MSC 401 may allocate the Mobile Station Roaming Number (MSRN) for the concerned subscriber, i.e. for the mobile station 409, and return the PRN message to the HLR 413, step 3, which, in turn, returns the SRI message to the core network, step 4. In response thereto, a BICC (Bearer Independent Call Control) initiated IAM (Initial Address Message) is provided to the first MSC 401, step 5, which, in response thereto, pages the mobile station 409 by sending a RANAP (Radio Access Network Application Part) message comprising a paging request with a TMSI, by way of example, step 6. Upon receiving the paging request, the RNC 411 transmits a RRC (Radio Resource Control) paging message with the TMSI to the mobile station 409, step 7. After receiving the paging request, the mobile station 409 may derive the intra-domain None Access Stratum (NAS) node selector (IDNNS) parameter from its TMSI, step 8, return the RRC message Initial Direct Transfer (IDT) including the IDNNS parameter and encapsulating the NAS message paging response to the RNC 411, step 9. In response thereto, the RNC 411 may select the core network node, e.g. the first MSC 401, step 10, based on the received IDNNS parameter, wherein the RANAP initial UE message encapsulating the NAS message paging response is transmitted to the first MSC 401, step 11.

Figure 5:
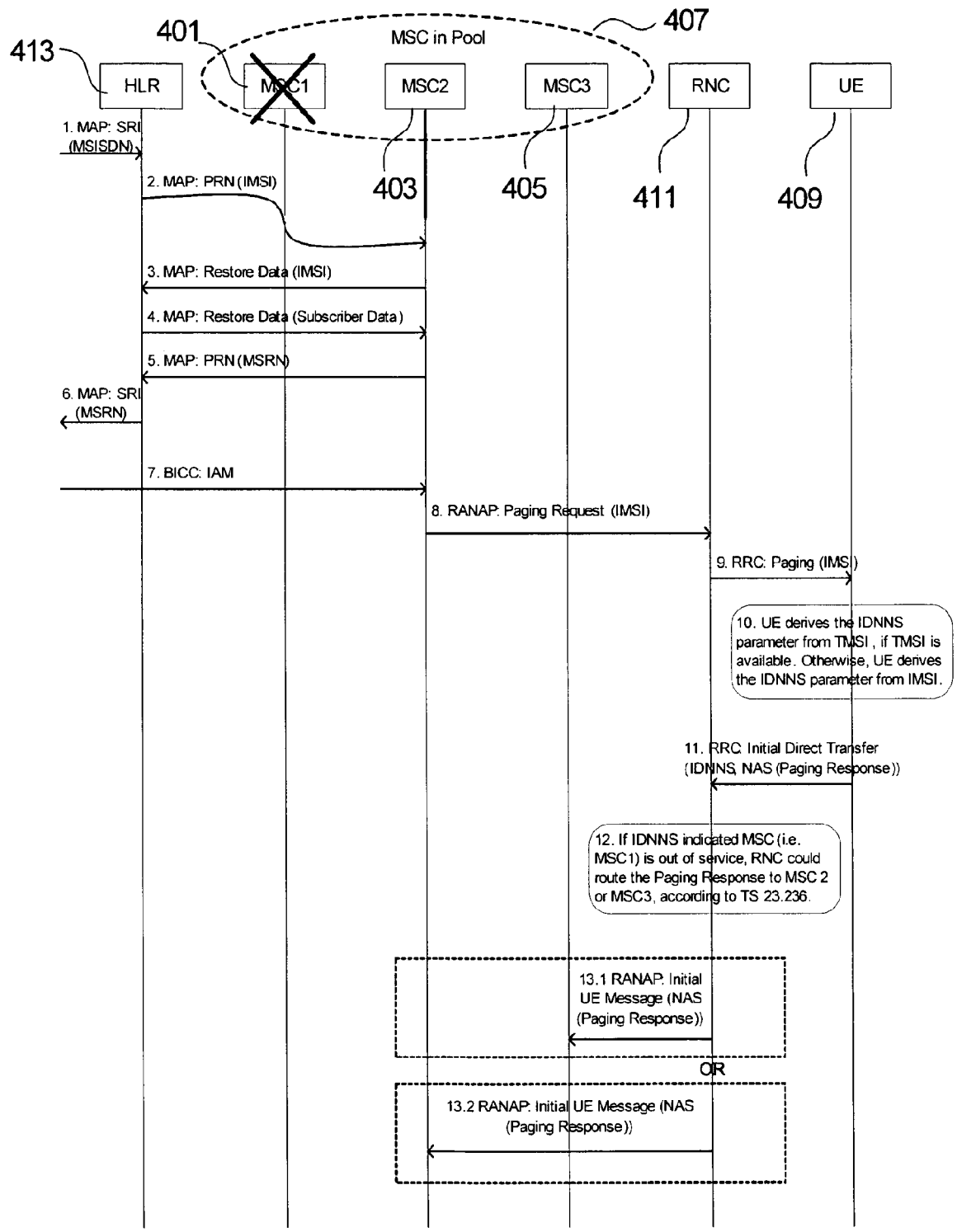
FIG. 5 shows a sequence diagram depicting exemplary messages in a mobile call termination.

However, it is possible that one of the MSCs 401 to 405 in the MSC pool 407 is out of service, wherein also global paging may not be supported. In this case, the mobile station 409 may be registered in a further MSC pool member or proceed upon the basis of a periodic location update. Such scenario is depicted in FIG. 5, where, by way of example, the first MSC 401 is out of service. In difference to the scheme shown in FIG. 4, the PRN message with the IMSI may alternatively be routed to the second MSC 403 representing a stand-by MSC for the first MSC 401. The stand-by MSC is the MSC which handles the mobile terminated traffic for the failed MSC in the MSC pool 407. Therefore, the subscriber data concerning the mobile station 409 and including the IMSI and the location area identifier have already been replicated to the second MSC 403 by the first MSC 401.

In reference to FIG. 5, the HLR 413 sends the MAP message Provide Roaming Number (PRN) to the first MSC 401, step 1, which is, by way of example, out of service. Due to an alternative routing configuration, the PRN message is rerouted to the second MSC 403 which is a stand by for the first MSC 401, step 2, wherein the second MSC 403 sends the MAP message Restore Data to the HLR 413, step 3, which thereafter returns the MAP message Restore Data with the subscriber data concerning the mobile station 409, step 4. Thereafter, the second MSC 403 allocates the Mobile Station Roaming Number (MSRN) for the mobile station 409 and returns the PRN message to the HLR 413, step 5, which returns the SRI message, step 6. Thereafter, the second MSC 403 receives the IAM message, step 7, and pages the mobile station 409 by sending the RANAP message Paging Request with the IMSI of the mobile station 409, step 8. Then, the RNC 411 sends the RRC Paging message with the IMSI to the mobile station 409, step 9. After receiving the paging request, the mobile station 409 derives the Intra-Domain NAS Node Selector (IDNNS) parameter from its TMSI, if TMSI is available, step 10. Otherwise, the mobile station 409 derives the IDNNS parameter from its IMSI. Thereafter, the mobile station 409 returns the RRC message Initial Direct Transfer, which includes IDNNS parameter and encapsulates the NAS message Paging Response, step 11. Then, the RNC 411 tries to select the CN node, i.e. a MSC, based on the received IDNNS parameter, step 12.

Thereafter, the following approaches may be implemented:

If the IDNNS is derived from the TMSI in e.g. a WCDMA or TD-SCDMA or UMTS network scenario, and the first MSC 401 selected from the IDNNS is not available, then, according to the TS 23.236 standard, the RNC 411 may select any one of the available MSCs 403, 405 in the MiP 407. In particular, the RNC 411 may select the CN node, e.g. the third MSC 405, which did not initiate the paging request.

Alternatively, if the IDNNS is derived from IMSI and the Global-CN-ID identifying the paging MSC in the paging request is not stored by the RNC 411, then the CN node selected from IDNNS, e.g. the first MSC 401, may not be available. In this case, according to the TS 23.236 standard, the RNC 411 may select one of the further available MSCs 403, 405 in the MiP 407. In particular, the RNC 411 may also select a CN node which did not initiate paging request, e.g. the third MSC 405.

If, however, the TMSI is not available then the IDNNS may also be derived from the IMSI, and if the RNC 411 stores the Global-CN-ID, then the CN node selection may be based on the stored Global-CN-ID and the appropriate MSC, i.e. the second MSC 403, may be selected as the CN node.

According to the selection result, the RNC 411 may transmit the RANAP Initial UE message, which encapsulates the NAS message Paging Response, step 13.1 or step 13.2 respectively. As mentioned above, the RANAP message may be transmitted to the second MSC 403 or even to the third MSC 405. If the paging response reaches the third MSC 405, then the third MSC 405 may determine which MSC in pool paged the mobile station and re-transmit the paging response to the relevant MSC for further proceeding. Thus, the third MSC 405 does not immediately discard the paging response which reduces the paging response failure rate and terminating call failures. Furthermore, unnecessary repetitions of the paging request by the second MSC 403 are avoided, so the air interface resources may more efficiently be used.

If the MSC which did not initiate the paging request receives a paging response with IMSI then it may transmit multicast packets within the MSC pool to inquiry the IMSI paging initiator. According to some implementations, only the MSC initiating the paging request may answer the multicast inquiry so that unnecessary communications may be avoided. Upon reception of the reply for the multicast inquiry, the MSC receiving the original paging response may forward or relay the paging response towards the paging initiator MSC.

According to some implementations, a pair of multicast messages for paging initiator inquiry may be implemented for the MSCs in the pool area. Further, the MSCs may be configured to buffer the paging response when waiting for paging initiator reply and to forward the paging response upon receiving the multicast reply, i.e. the aforementioned acknowledgement message.

According to some implementations, when a MSC in pool which did not initiate the paging request receives a paging response along with the IMSI, and if this MSC does not have a corresponding IMSI record e.g. in its VLR then the MSC may transmit a multicast packet containing the IMSI to the other MSCs in the pool to inquire the IMSI paging initiator. The MSC may also start a timer to wait for the inquiry reply which may be formed by an acknowledgement message indicating the paging initiator.

For example, only the MSC initiating the paging request may answer to the multicast inquiry, wherein the other MSCs which did not initiate the paging request do not respond, i.e. remain silent. Upon reception of the reply for the multicast inquiry being formed by e.g. the acknowledgement message, the MSC receiving the original paging response may stop the counter, e.g. an inquiry waiting timer, and forward the buffered paging response towards the MSC which is the paging initiator. After successfully forwarding the paging response, the buffered paging message may be removed from the memory. In addition, if the inquiry waiting timer reaches a timer value associated with a predetermined waiting interval then the MSC may remove the buffered paging response message from the memory.

Figure 6:
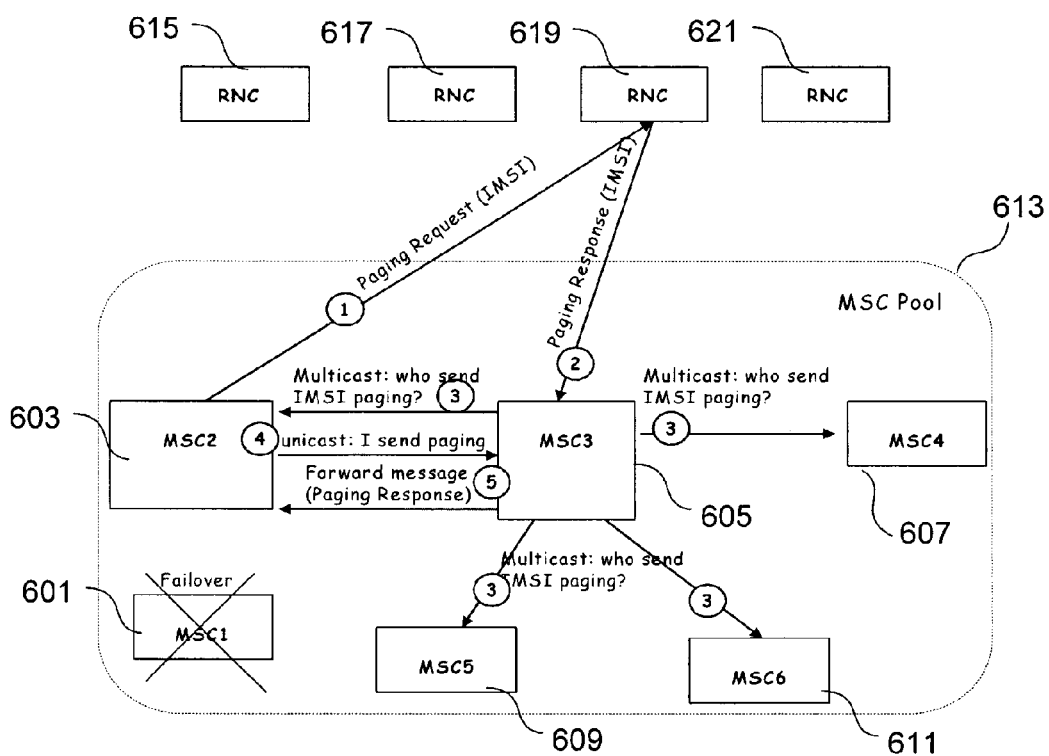
FIG. 6 shows diagram depicting an exemplary arrangement of a pool of mobile switching centers.

FIG. 6 shows, by way of example, the MSCs 601 to 611 being arranged to form a MSC pool 613 handling communications towards mobile stations via the RNCs 615 to 621 of corresponding BSSs according to the enhanced IMSI paging MSC forwarding approach described herein. As depicted in FIG. 6, the first MSC 601 may be, e.g. due to a failover, out of service. In this case, the second MSC 603 being configured as a stand-by for the first MSC 601 transmits a paging request including e.g. the IMSI to the RNC 619, step 1, communicating with a mobile station not depicted in FIG. 6.

Upon receiving the paging response from the mobile station, the RNC 619 may transmit the paging response along with identity information identifying the mobile station, e.g. along with the IMSI to e.g. the third MSC 605, step 2. In response thereto, the third MSC 605 may determine whether the paging request was initiated by the third MSC 605. If the paging request which is received by the third MSC 605 was not initiated by the third MSC 605 then the third MSC 605 may multicast the identity information to the MSCs 603, 607, 609 and 611 in order to determine which MSC of the MSC pool 613 paged the mobile station with the IMSI, step 3. In response thereto, the second MSC 603 may transmit, e.g. in a unicast fashion, an acknowledgement message to the third MSC 605 in order to acknowledge that the mobile station was paged by the second MSC 603, step 4. The other MSCs 607, 609 and 611 may refrain from transmitting any non-acknowledgement message in order to avoid unnecessary communications. The third MSC 605 may forward the paging response to the second MSC 603, step 5.

Accordingly, an efficient and successful MTC may be ensured even if one of the MSCs in pool is out of service. Furthermore, according to some implementations, the mobile terminated call success rate may even be improved, wherein the network and the air traffic load may be reduced due to the paging repetition. Furthermore, according to some implementations, the IMSI paging response success rate may be improved by avoiding forwarding the paging response to the MSC in pool which did not page the mobile station.

Still in reference to FIG. 6, the MSC pool 613 comprising the MSCs 601 to 611 may manage the IMSI paging and MSC forwarding approach described in the following. First, if the first MSC 601 is out of service due to e.g. a failure then the stand-by MSC 603 may initiate the paging with the IMSI instead of the MSC 601 when receiving a MT call indication. The paging procedure may be triggered towards the RNCs configured for the recovered LAI. Second, the RNC 619 may receive the paging response and select the third MSC 605 upon the basis of e.g. a load sharing mechanism according to the TS 23.236 standard when the first MSC 601 has been detected as being not available. However, the third MSC 605 may unexpectedly receive the paging response message with the IMSI so that a corresponding IMSI record in its VLR is missing. Then, the third MSC 605 may transmit a multicast packet containing the IMSI of the paging response to inquiry the MSC in pool which is the paging initiator. By way of example, the third MSC 605 may start a timer to wait for the inquiry reply. Next, the second MSC 603 may reply to the multicast inquiry when detecting that it has a pending paging context corresponding to the IMSI contained in the multicast packet. Other MSCs preferably do not reply to the multicast and remain silent. Next, upon receiving the inquiry reply, the third MSC 605 may stop the timer, may forward the paging response to the second MSC 603, and may remove the buffered paging response message from the memory.

With reference to the above embodiments, according to some implementations, in order to reduce the CPU process load, only the MSC which initiated the paging request by e.g. taking over e.g. a functionality of another MSC may open the port to listen to the multicast inquiry message e.g. comprising the re-transmitted or forwarded identity information. The MSC which did not initiate the paging request instead of its standby MSC may not open the listen port for the multicast message. In this way, the multicast message may be discarded at IP level without going to MSC application layer for the MSC which did not initiate the IMSI paging request instead of its standby MSC. Therefore, the CPU load may be less affected. By way of example, the port may be closed when no further paging context is pending. The port may be a unique port for MSC pool.

Still in reference to the above embodiments, according to some implementations relating to the WCDMA case, when receiving the IMSI paging, the mobile station, i.e. the UE, may return the TMSI, if available in the IDNNS parameter of the Initial Direct Transfer message according to the TS25.331 standard. Furthermore, according to the TS 23.236 standard, the RNC may use the received IDNNS parameter to route the Initial UE message without decoding it into Paging Response message. As the TMSI of the mobile station indicates that the relevant MSC is e.g. out of service, the RNC may, by way of example, round-robin the Initial UE message, e.g. with paging response, to any other available MSC in the pool. However, the RNC may also determine in advance to which MSC the paging response is to be forwarded by re-transmitting the identity information. Correspondingly, the receiving MSC may determine which MSC in pool initiated the paging response in order to forward the paging response towards that MSC.

The particular combinations of elements and features in the above detailed embodiments are exemplary only; the interchanging and substitution of these embodiments with other embodiments disclosed herein are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. A network entity for handling communications towards a mobile station over a communication network, the mobile station being capable of receiving a non-global paging request from a mobile switching center of a pool of mobile switching centers, and, in response to the non-global paging request, of transmitting a non-global paging response over the communication network, the network entity comprising:
    a receiver to receive the non-global paging response, the non-global paging response comprising identity information identifying the mobile station; and
    a transmitter to re-transmit the identity information, in response to the receiver receiving the non-global paging response, to a plurality of mobile switching centers in the pool of mobile switching centers;
    wherein the network entity is a mobile switching center.

2. The network entity according to claim 1, wherein the transmitter is configured to re-transmit the identity information to a plurality of mobile switching centers in the pool of mobile switching centers in order to determine which mobile switching center in the pool of mobile switching centers initiated the non-global paging request.

3. The network entity according to claim 1, further comprising a processor to determine upon the basis of the identity information which mobile switching center initiated the non-global paging request.

4. The network entity according to claim 1, wherein the network entity further comprises a processor to determine whether the non-global paging request was initiated by the network entity.

5. The network entity according to claim 1, wherein the transmitter is configured to re-transmit the identity information only if the non-global paging request which initiated the non-global paging response was initiated by the network entity.

6. The network entity according to claim 1, wherein the network entity comprises a processor configured to compare the identity information with pre-stored identity information to determine whether the network entity initiated the non-global paging request.

7. The network entity according to claim 1, wherein the transmitter is configured to re-transmit the identity information by one of:
    multicasting the identity information;
    broadcasting the identity information; and
    re-transmitting the identity information directly to each of the plurality of mobile switching centers.

8. The network entity according to claim 1, further comprising a memory to temporarily store the non-global paging response, the non-global paging response being deleted upon one of an:
    expiration of a predetermined period of time; and
    reception of an acknowledgement message from a further mobile switching center in response to the re-transmitted identity information, the acknowledgement message indicating that the non-global paging request was initiated by the further mobile switching center.

9. The network entity according to claim 1, further comprising a counter to determine an expiration of a predetermined period of time after re-transmitting the identity information.

10. The network entity according to claim 1, wherein
    the receiver is configured to receive an acknowledgement message from a further mobile switching center in response to the re-transmitted identity information, the acknowledgement message indicating that the non-global paging request was initiated by the further mobile switching center, and wherein the transmitter is configured to forward the non-global paging response to the further mobile switching center.

11. The network entity according to claim 1, wherein the identity information comprises one of an International Mobile Subscriber Identity and a Temporary Mobile Subscriber Identity.

12. The network entity according to claim 1, further comprising a processor and wherein:
    the receiver is configured to receive further identity information from a further network entity, such as a further switching center, the further identity information identifying a further mobile station;
    the processor is configured to compare the further identity information with pre-stored identity information to determine whether the network entity initiated a further non-global paging request to the further mobile station;
    the transmitter is configured to transmit an acknowledgement message to the further network entity if the further identity information corresponds to the pre-stored identity information, the acknowledgement message indicating that the network entity initiated the further non-global paging request to the further mobile station; and one of the processor and the transmitter is configured to discard the further identity information without response when the network entity did not initiate the further non-global paging request.

13. The network entity according to claim 1, wherein the network entity is arranged to support communications according to at least one of the following communication technologies:

Universal Mobile Telecommunication System (UMTS);
Global System for Mobile Communications (GSM);
Long Term Evolution (LTE); and
Code Division Multiple Access 2000 (CDMA2000).

14. A pool of mobile switching centers for handling communications towards a mobile station over a communication network, the mobile station being capable of receiving a non-global paging request from one of the mobile switching centers of the pool of mobile switching centers, and, in response to the non-global paging request, of transmitting a non-global paging response over the communication network, the pool of mobile switching centers comprising:

a plurality of mobile switching centers each comprising a receiver to receive the non-global paging response comprising identity information identifying the mobile station, and a transmitter to re-transmit the identity information, in response to the receiver receiving the non-global paging response, to a plurality of mobile switching centers in the pool of mobile switching centers.

15. A method for handling communications towards a mobile station over a communication network upon a basis of a pool of mobile switching centers, the mobile station being capable of receiving a non-global paging request, and, in response to the non-global paging request, of transmitting a non-global paging response over a communication network, the method comprising:

receiving the non-global paging response by a mobile switching center, the non-global paging response comprising identity information identifying the mobile station; and re-transmitting the identity information, in response to receiving the non-global paging response, by the mobile switching center to a plurality of mobile switching centers in the pool of mobile switching centers.

16. A computer program product stored in a non-transitory computer readable storage medium that stores computer-executable process steps for handling communications towards a mobile station over a communication network upon a basis of a pool of mobile switching centers, the mobile station being capable of receiving a non-global paging request, and, in response to the non-global paging request, of transmitting a non-global paging response over a communication network, said computer-executable process steps causing a computer to perform the steps of:

receiving the non-global paging response by a mobile switching center, the non-global paging response comprising identity information identifying the mobile station; and re-transmitting the identity information, in response to receiving the non-global paging response, by the mobile switching center to a plurality of mobile switching centers in the pool of mobile switching centers.

17. A network entity for handling communications towards a mobile station over a communication network upon a basis of a pool of mobile switching centers, the mobile station being capable of receiving a non-global paging request, and, in response to the non-global paging request, of transmitting a non-global paging response over a communication network, the network entity being configured to:

receive the non-global paging response by a mobile switching center, the non-global paging response comprising identity information identifying the mobile station; and re-transmit the identity information, in response to receiving the non-global paging response, by the mobile switching center to a plurality of mobile switching centers in the pool of mobile switching centers.

\* \* \* \* \*